Sept. 14, 1943. A. L. BAUSMAN 2,329,178
CONVEYER FOR CONFECTIONS FOR CONDITIONING AND OTHER PURPOSES
Original Filed July 10, 1940 3 Sheets-Sheet 2
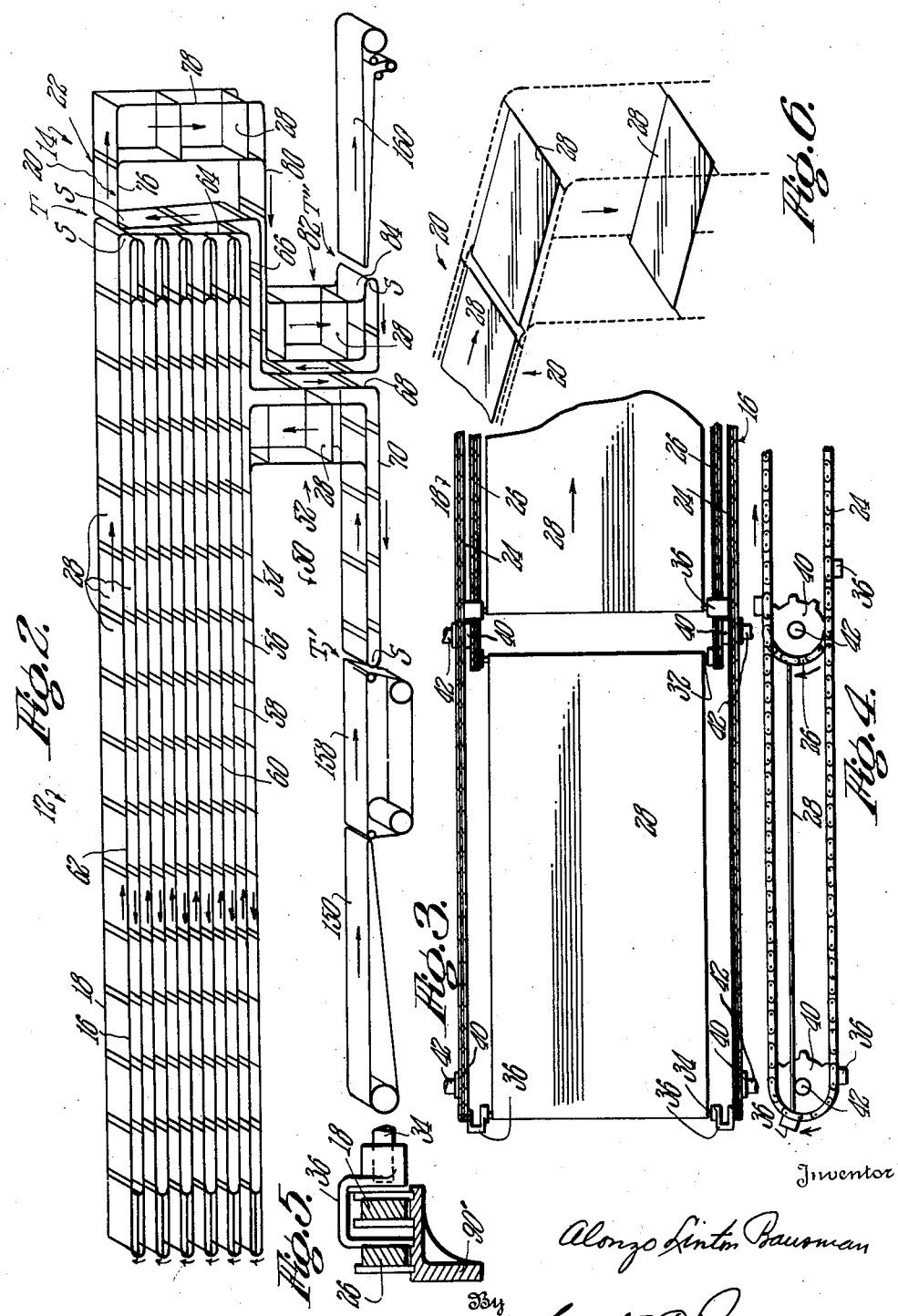
Inventor
Alonzo Linton Bausman
By Walter C. Ross
Attorney Sept. 14, 1943.   A. L. BAUSMAN   2,329,178
CONVEYER FOR CONFECTIONS FOR CONDITIONING AND OTHER PURPOSES
Original Filed July 10, 1940   3 Sheets-Sheet 3
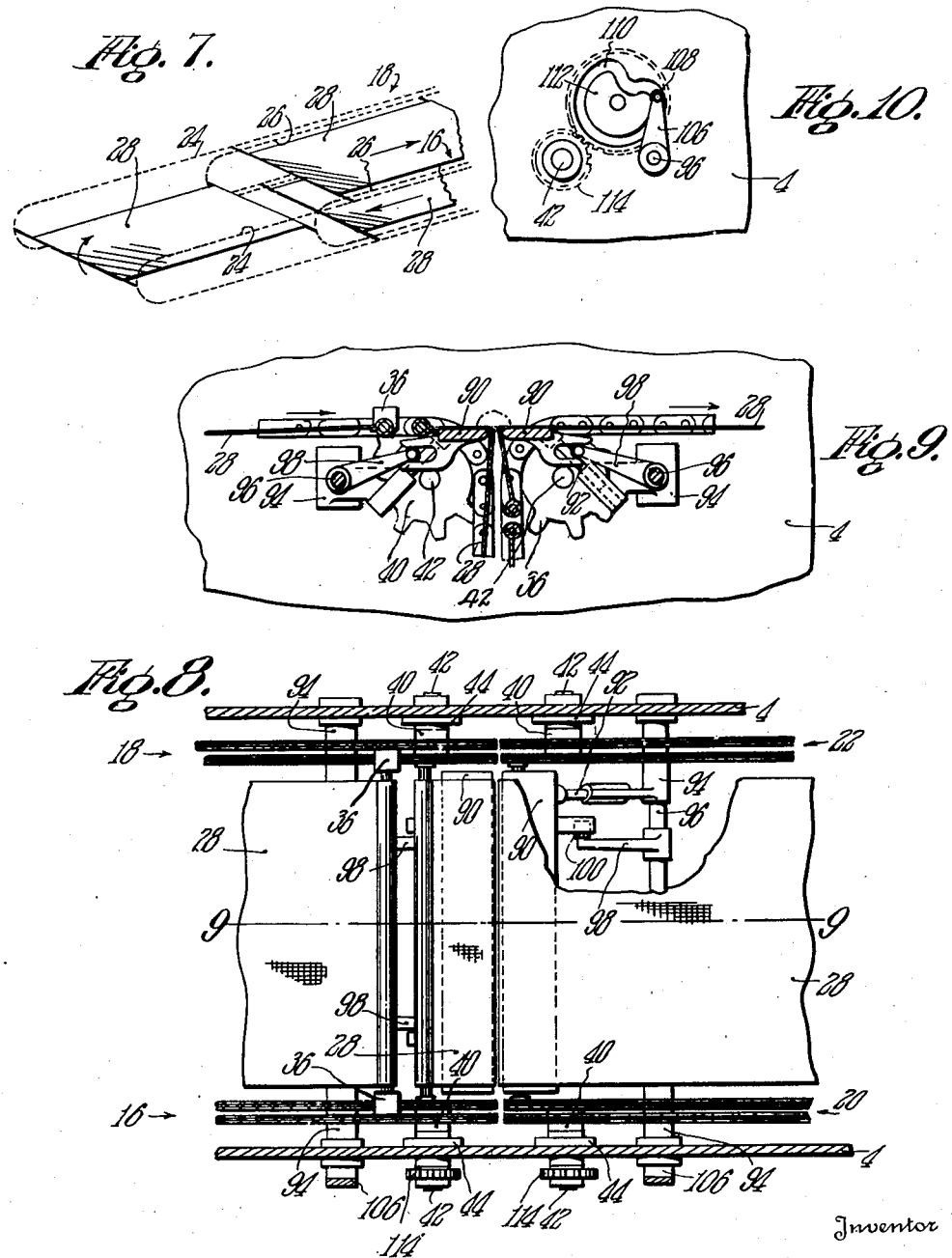

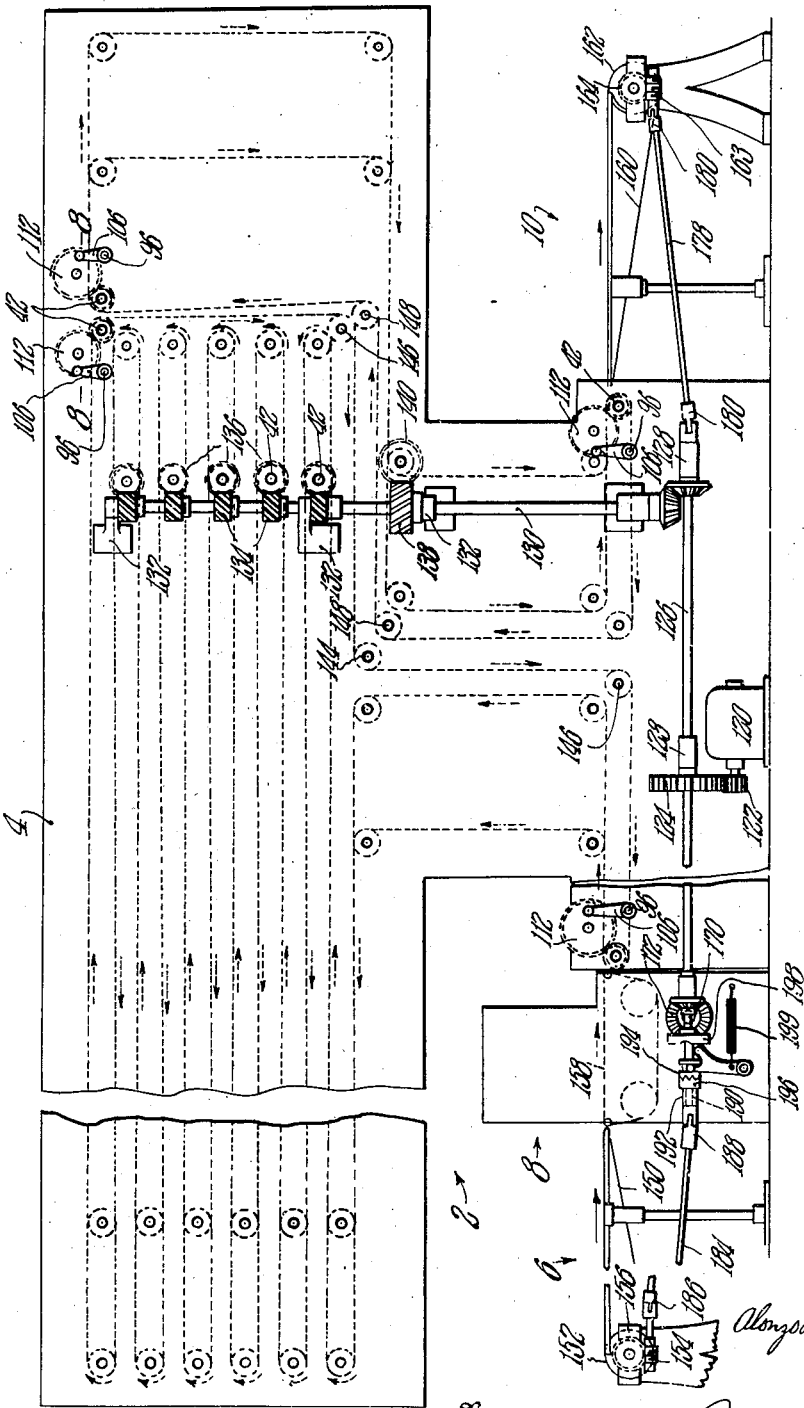

Patented Sept. 14, 1943

2,329,178

UNITED STATES PATENT OFFICE 2,329,178

CONVEYER FOR CONFECTIONS FOR CONDITIONING AND OTHER PURPOSES

Alonzo Linton Bausman, Springfield, Mass., assignor to National Equipment Co., Springfield, Mass., a corporation of Massachusetts Original application July 10, 1940, Serial No. 344,727. Divided and this application May 13, 1941, Serial No. 393,214

1 Claim. (Cl. 198—20)

This invention relates to improvements in apparatus for use in connection with the manufacture of confections and the like and is directed more particularly to improvements in conveying apparatus adapted for use in combination with apparatus for performing various steps in the process of manufacturing confections and similar products.

This application is a division of my pending application Ser. No. 344,727 filed July 10, 1940.

In the manufacture of confections such as candy it is usual practice to cover or coat pieces of material with some such material as chocolate or the like and it is usually desired that the confection be conditioned, tempered or cooled as by conveying the confections through a compartment or the like which contains or into which is directed air for the desired conditioning.

According to the novel features of this invention there is provided a conveying apparatus which is adapted for use in combination with apparatus for applying coatings or coverings to candies or the like that is constructed and arranged to receive the confection and to convey the same into or through a compartment or compartments for the desired conditioning or cooling operations and then to deliver the same to a unit such as a packing table or conveyer where the confections may be inspected, wrapped, or packaged all as may be desired.

The apparatus of the invention is adapted for various purposes but is particularly adapted for use in the confection manufacturing industry hence the reference herein to the manufacture of confections is to facilitate a clear understanding of the novel features of the invention and for the purposes of disclosure the term "goods" may mean confections or other products.

An important feature of the invention includes the provision of a first conveyer for receiving goods from some apparatus used in combination therewith, a second conveyer for delivering the goods to some form of apparatus for subsequent operations, and an improved transfer device for transferring the goods from the first conveyer to the second conveyer. These conveyers are hereinafter referred to as sections for the reason that together they provide conveying apparatus having the transfer device associated with them.

The novel features and advantages of the invention are accomplished in a broad way by providing in each of the before-mentioned first and second sections, pairs of transversely spaced endless conveyer members, which may be chains or the like, each of the pairs consisting of inner and outer members. Separate goods-supporting members are disposed between the pairs of endless members with their opposite ends carried by the outer and inner endless members of the pairs. The endless members are supported and directed in such a way that the goods-supporting members of the first section are moved generally inwardly and upwardly from a lower level and then back and forth in horizontal planes to an upper level. Then the goods are transferred from successive goods-supports in the upper level onto goods-supports of the endless members of the second section which endless members are arranged to move the said goods-supports downwardly to the lower level and otherwise to and through a discharging position where the goods may be discharged onto a belt or the like of a packing apparatus for respective wrapping or packaging.

As a still further feature the goods supporting members carried by the flexible members for supporting the goods are relatively flexible, and shelves or supporting members are provided over which the goods-supporting members travel from horizontal to vertical positions or vice versa. The shelf members or supports are arranged and adapted to position the goods-supporting members in such a way as to close the gap between a goods-support and an adjacent unit to facilitate transference of goods onto or from the goods-supports of one section to the other.

A still further feature of the invention provides a structure wherein the endless flexible conveyer-forming members are supported in such a way that the goods-supporting members thereof when supporting goods are disposed in horizontal positions at all times either when being moved upwardly, downwardly, horizontally, or when the direction of movement is changed from the vertical to horizontal or vice versa.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings, wherein:

Fig. 1 is a side elevational view of a conveyer apparatus of the invention shown in combination with apparatus for delivering goods to and receiving the same from said apparatus;

Fig. 2 is a diagrammatic perspective view showing the various elements of the conveyer of the invention;

Figs. 3 and 4 are plan and side elevational views respectively showing certain features of the conveyer of the invention;

Fig. 5 is a sectional elevational view showing one means for supporting and guiding the flexible members of the apparatus;

Figs. 6 and 7 are diagrammatic perspective views of portions of the conveyer to explain certain features thereof;

Fig. 8 is a sectional plan view on the line 8—8 of Fig. 1;

Fig. 9 is a sectional elevational view on the line 9—9 of Fig. 8; and

Fig. 10 is an elevational view of the operating mechanism for one of the shelf members of the apparatus.

Referring to the drawings more in detail, the invention will now be described more fully.

In Fig. 1 there is indicated generally by 2 a conveyer housing which may have side walls such as 4, and bottom, upper and end walls associated therewith. The walls may be arranged to form an enclosure or compartment within which the conveying apparatus is located and means for conditioning the atmosphere within the compartment may be provided such as for cooling or the like. That is, air conditioning as may be desired may be delivered into the compartment at one or more points.

In the form of the invention shown, the side walls serve generally to support the mechanism of the conveyer but in another way the conveyer structure may be supported by a frame work located within a room or compartment. The particular form of the frame work or compartment may be varied within wide limits to suit requirements.

At 6 is represented a feed unit for feeding goods to a unit 8 which, in the form of the invention shown, applies coating material to the goods. The goods are received from the unit 8 onto an initial horizontal run of the conveyer of the invention and said goods are discharged from the conveyer to a unit 10 where said goods may be inspected, packaged, or wrapped.

Obviously other units than those shown may be used in association with the conveyer if desired. The conveyer apparatus includes in a general way first and second co-operating sections represented in Fig. 2 by 12 and 14. Goods are received at a relatively low level of the first section, conveyed back and forth and upwardly therein to a higher level and transferred to an upper level of the second section and carried thereby to a lower level for discharge.

Each conveyer section has spaced pairs of endless conveyer members at opposite longitudinal sides thereof and the said pairs of members each consist of outer and inner flexible members which may be in the form of chains, such as roller or block chains where links are hingedly connected to rollers or blocks.

The pairs of chains in the first section are indicated generally by 16 and 18 in Fig. 2 while forward and rear pairs of chains in the second section are indicated by 20 and 22. The chains of the pairs are disposed relatively close to one another as indicated in Fig. 3 where 24 indicates the outer chains and 26 the inner chains of the pairs of chains of the first section. In the second section the chains are similarly disposed.

The endless chains of each section are supported by sprockets so that the chains extend in horizontal and vertical runs and some or any desired ones of the sprockets are driven for driving the chains, all as will hereinafter appear. In both sections there are disposed between the pairs of chains a plurality of supporting members such as 28 for supporting and conveying goods.

The supporting members are flexible and may be of fabric or the like. The forward and rear ends of the supporting members 28 are carried by the outer and inner chains respectively.

To accomplish this the ends of the members may be formed to provide tubes in which are rods such as 32 and 34 as in Fig. 3. The rods 32 are associated with links of chains 26 while the rods 34 are carried by brackets 36 associated with the other chains 24.

The rods are so arranged in the links and brackets, or the rods are so mounted on the supporting members, that they may turn when the chains pass around sprockets. This is so the supporting members may maintain horizontal goods-supporting positions when the chains move horizontally, vertically, or move from vertical to horionztal positions, or vice versa.

The sprockets are either rotatable on shafts carried by bearing brackets associated with the walls 4 or a frame work or are fixed on shafts which are rotatable in the brackets. Typical sprockets 40, shafts 42, and brackets are indicated in Figs. 8 and 9.

The sprockets are so disposed as to each section of the conveyer that the goods supporting members 28 are maintained when supporting goods, in horizontal goods-supporting positions in the horizontal and vertical runs of the chains as well as when vertical runs extend into horizontal runs and vice versa.

The runs provided by the arrangement of the sprockets will now be described in detail.

In the first section there is a lower level initial horizontal run of chains indicated by 50 and vertical runs of chains indicated by 52. The vertical runs of chains have the sprockets for either the inner or outer chains of the pairs of chains disposed forwardly of the sprockets for the other chains of the pairs. The spacing of the chains of the pairs in the vertical run is such as to accommodate the length of the supporting members 28. This is so that the members 28 are carried forwardly at the lower level into the vertical runs and as the chains move vertically upwardly the supporting members are maintained in horizontal relation.

The chains from the vertical run 52 extend to the left in a horizontal run 54. At the left of said run the sprockets for the outer chains are spaced forwardly of or outwardly from the sprockets for the inner chains, so that the supporting members while maintained in horizontal relation are carried upwardly and around from the horizontal run 54 to a horizontal run 56. The members 28 are maintained in horizontal relation while the chains pass from a lower run to the run thereabove.

At the right of the run 56 the sprockets for the inner chains are spaced outwardly from those for the outer chains so that chains pass from run 56 into a horizontal run 58 extending to the left. Likewise at the end of run 58 the chains are positioned to provide run 60. In this manner, the chains are positioned to provide several, or as many horizontal runs as may be desired, until finally there is an upper horizontal run 62.

At the end of said run 62 the chains pass downwardly at 64 in vertical planes, to the left at 66, downwardly at 68, and horizontally at 70 into the initial run 50. In this way, the supporting members are moved first horizontally at the lower level, then vertically, and then horizontally back and forth, until finally carried by the uppermost horizontal run at the higher level to a point at the right indicated by T where goods thereon are transferred to the second section as will be later described.

The chains of the second section are supported by sprockets arranged after the manner described so as to provide a horizontal run 76 at the upper level, a vertical run 78, a horizontal run 80, a vertical run 82 and a horizontal run 84. The supporting members 28 of the second section while maintained in horizontal position at the upper level to receive goods from run 62 of the first section, they move to the right horizontally, downwardly, to the left, downwardly again and then to the right for discharging the goods to unit 10.

The chains between the sprockets, particularly in the horizontal runs, are supported and guided by some suitable means such as elongated guides 90', shown in section in Fig. 5. Any other means may be employed, it being desired to maintain the chains in such positions that they may be moved relatively freely and held in proper spaced relation and alignment.

The rods between the chains supporting the members 28 may guide the chains in their spaced relation but means may be associated with the guides for spacing the chains if desired. The supporting guides may be secured to the walls or some supporting structure.

The relative arrangement of the chains in the second section as they extend from the horizontal run 76 to the vertical run 78 is shown in Fig. 6. The arrangement of the chains as they pass upwardly and around from the horizontal runs such as 54 and 58 to runs thereabove at the left in the first section, is shown in Figs. 3 and 4.

It will be understood that, when the chains pass from a horizontal run to a vertical run, or vice versa, and where it is desired to maintain the supporting members in horizontal positions, the sprockets for the outer or inner chains of the pairs are spaced outwardly or forwardly of the sprockets for the other chains of the pairs. This is so that opposite ends of the members 28 pass around sprockets simultaneously and are maintained horizontally in vertical runs.

At points where goods are transferred from the supporting members of one section to those of another as at T and from unit 8 onto the supporting members as at T' or discharged from supporting members to unit 10 as at T'', means is provided for supporting the moving supporting members so that they close the gaps to facilitate the transfer of goods.

Such means are provided at points indicated by S in Fig. 2. Said means include in each instance, as shown in Figs. 8, 9 and 11, a shelf or support 90 disposed between the pairs of chains mounted for movement between the supporting position shown in Fig. 9 and non-supporting position downwardly and inwardly therefrom as shown in Fig. 11. These members 90 move obliquely between supporting and non-supporting positions and are horizontal at all times. By reference to Fig. 9 it will be seen how the shelves in supporting positions allow the goods supports to move from horizontal to vertical position while closing the gap.

Various means may be provided to facilitate movement of the members 90 but in the form of the invention shown, rods 92 depending from the member 90 are slidable in brackets 94 which are carried by walls 4. A shaft 96 one for each member 90 is rotatable in the brackets 94. One or more levers 98 fixed to shafts 96 have roll 100 on the free ends thereof that operate in slots of the member 90, as shown. The shaft 96 is oscillatable and as it oscillates in one direction or the other to swing levers 98 up or down, the members 90 are moved between supporting and non-supporting positions.

As the goods are transferred from supporting members of the first section 12 to supporting members of the second section the members 90 are in upper supporting position. The supporting members of the first section move horizontally to the right and then vertically downwardly while the supporting members of the second section move vertically upwardly and then horizontally to the right.

As the gap between the adjacent ends of adjacent supporting members 28 of the sections approach the members 90 the said members are moved downwardly and away from each other to allow the ends of the supporting members to pass.

The said shafts 96 and their levers are operated in timed relation with the chains and supporting members by means of levers 106 fixed to shafts 96 that have rolls 108 in suitable cam grooves 110 of cams 112. To drive said cams 112 they are geared to gears 114 fixed on sprocket shafts 42 of an adjacent sprocket as shown in Fig. 8.

Each of the supports 90 where located at S is operated between supporting and non-supporting position by means similar to that described. They not only serve to support the supporting members 28 as their direction of movement is changed from the horizontal to the vertical or vice versa but serve to close up the gap between adjacent goods-supporting members and those of adjacent sections so that goods may be transferred across said gap.

The sprockets of the conveyer sections may be driven by various means and as many of the sprockets may be driven as may be desired. According to the driving arrangement shown there is a main drive for the conveyer and the associated units.

To accomplish this, a motor indicated at 120 is geared, as by gears 122 and 124, to a shaft 126 that is suitably journalled in bearings 128. A vertical shaft 130 journalled in bearings 132 is geared, as by gears 134, to gears 136 of certain of the sprocket shafts 42 of the first section. Shaft 130 is driven from shaft 126 by gears, as shown.

Another gear 138 of shaft 130 is in engagement with a gear 140 of a sprocket shaft 42 of the second section. By means of shaft 130 and the gears described sprockets of the first and second section are driven in timed relation.

As before pointed out the shafts for the chain sprockets are disposed at opposite sides of the apparatus. The driving mechanism described is operatively connected to the sprockets at the forward side of the conveyer. For driving as many of the sprockets on the rear side of the apparatus as may be desired, such shafts as indicated by 144 and 146 may extend transversely through the apparatus.

The unit 6 referred to make take the form of a feed table or conveyer and includes an endless feed belt 150 that extends forwardly from and is driven by a drum or roll 152 that, in turn, is rotated by means of a worm 154 in engagement with a worm gear 156 thereof. The unit 8 is a coating machine having a belt 158 for conveying the objects to be coated and said belt receives the articles to be coated from the belt 150.

The unit 10 includes an endless belt 160 extending from the conveyer to a driving drum 162 which is driven by a worm 163 in engagement with a worm gear 164 thereof. The above referred to units are illustrated in a diagrammatic way only, as they are well known in the art and form no part of the present invention except as they combine with the apparatus to provide an continuously operating whole.

The shaft 126 carries a gear 170 in mesh with a gear 172 of the operating shaft of the coating machine 8, whereby the belt 158 thereof is driven in timed relation with the conveyer. A shaft 178 is connected by flexible couplings or universal joints 180 to the worm 163 of the unit 10 and to the shaft 126, whereby said unit 10 is driven in timed relation with the conveyer.

A shaft 184 has one end connected, as by a universal joint 186, to the driving mechanism of unit 6 and its other end is connected in a similar manner, by joint 188 to a shaft 190 journalled in a bearing 192. A clutch member 194, slidable back and forth on shaft 126, is adapted to engage and disengage a clutch part 196 on shaft 190 and a lever for actuating said clutch part 194 is operated by a cam 198 on said shaft 126.

Preferably a spring 199 is provided to urge said lever into engagement with the cam, all as shown. The parts are so arranged that the belt 150 is operated intermittently or operated in such a manner as to provide a gap in the arrangement of goods delivered to belt 158 which agrees with the gap between the goods-supporting members of the conveyer apparatus.

In operation, goods are placed, or received, on the belt 150 of unit 6 from which they are transferred onto belt 158 of unit 8 for the coating or other operation. From the belt 158 the goods are transferred onto the supporting members 28 carried by the chains of the first section of the conveyer.

For the transference of the goods from belt 158 to a supporting member 28 of the conveyer the support 90 at T' is in supporting position. As adjacent ends of adjacent goods supporting members approach the support 90, the said support 90 withdraws from position supporting one goods support and subsequently returns to underlie the next succeeding support. As previously stated the belt 158 carries goods thereon in such an arrangement as accommodates the gap between the goods supports 28 of the conveyer and is accomplished by intermittently operating belt 150 by means of cam-operated clutch members 194 and 196.

As goods are received on the goods supporting members of the initial run of the conveyer the goods supports are moved by the chains horizontally, then vertically upwardly while maintained in horizontal position, then horizontally back and forth from a lower run to an upper run and eventually to an uppermost run, from whence they are transferred to goods supporting members of the second section. The transfer is, of course, effected by means of the supports 90 at T which operate to support the goods supports 28 and close the gap and then move from supporting position when adjacent ends of adjacent goods supports 28 approach the supports 90.

In the second conveyer section the goods supporting members are moved horizontally, downwardly and vertically, then rearwardly horizontally and downwardly vertically and finally forwardly in horizontal position to discharge the goods onto belt 160 where they may be inspected, packaged or wrapped as may be desired. The supporting member 90 at position T'' operates as do those at positions T and T'.

The operation is such that the supporting members 28 are in continuous movement thereby to overcome the starting and stopping of parts as in step by step or intermittent operation and obviate the wear, shocks, and strains incident thereto.

By means of the invention it is possible to obtain the maximum of travel of the goods in the minimum of space and thereby provide the desired efficient operation as pertains to conditioning, cooling or other operations as may be desired or required in connection with the manufacturing confections and the like.

While I have described the invention in great detail and with respect to the present perferred form thereof, it is not desired to be limited thereto since changes and modifications may be made therein without departing from the spirit and scope of the invention. The invention may be embodied in other specific forms without departing from the essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What it is desired to claim and secure by Letters Patent of the United States is:

A conveyer construction comprising in combination two endless conveyers each consisting of a pair of inner chains and a pair of outer chains, cross rods connecting the chains of each pair, flexible goods supports having their forward ends supported by the cross rods of one pair of chains and their rearward ends supported by the cross rods of the other pair of chains, supporting and driving sprockets for said endless conveyer chains whereby each conveyer traverses a horizontal run and a vertical run, the horizontal runs being aligned and moving in the same direction for transfer of goods therebetween, and the vertical runs moving oppositely closely adjacent one another, movable members underlying the paths of the respective conveyers adjacent the transfer point for engagement with said flexible goods supports, and means for shifting said movable members between supporting and non-supporting positions in timed relation with the passing of said flexible goods supports, whereby as goods are transferred from one conveyer to the other the transfer gap between them is reduced to a minimum.

ALONZO LINTON BAUSMAN.